United States Patent [19]

Holleran et al.

[11] Patent Number: 5,781,189

[45] Date of Patent: Jul. 14, 1998

[54] EMBEDDING INTERNET BROWSER/ BUTTONS WITHIN COMPONENTS OF A NETWORK COMPONENT SYSTEM

[75] Inventors: Patrick A. Holleran, Santa Cruz; John S. Evans, Mountain View; Michael A. Cleron; Stephen Fisher, both of Menlo Park; Timo Bruck, Mountain View, all of Calif.

[73] Assignee: Apple Computer, Inc., Cupertino, Calif.

[21] Appl. No.: 435,671

[22] Filed: May 5, 1995

[51] Int. Cl.⁶ ............................................. G06F 15/00
[52] U.S. Cl. ............................................. 345/335
[58] Field of Search .......................... 395/155, 157, 395/161; 345/333, 334, 335, 346, 348, 351, 356, 357

[56] References Cited

U.S. PATENT DOCUMENTS 5,634,019  5/1997  Koppolu et al. .................. 345/335

5,699,518  12/1997  Held et al. ........................ 345/335

OTHER PUBLICATIONS

MacWEEK, Nov. 7, 1994, vol. 8, No. 44, Cyberdog to Fetch Internet Resources for Opendoc Apps, Robert Hess.
Opinion, MacWeek Nov. 14, 1994, The Second Decade, Cyberdog Could be a Breakthrough if it's Kept on a Leash, Henry Norr.
Develop, The Appled Technical Journal, "Building an OpenDoc Part Handler", Issue 19, Sep., 1994, pp. 6–16.

Primary Examiner—Phu K. Nguyen
Attorney, Agent, or Firm—Cesari and McKenna, LLP

[57] ABSTRACT

A network-oriented component system facilitates development of customized user interfaces to computer networks by embedding entities that reference resources located on the networks into components of the system. The embedded entities are preferably manifested as visual objects displayed on a graphical user interface of a computer screen that a user may manipulate to effectuate the embedding process. The "container" components are preferably compound documents having contents that include different data types and formats.

20 Claims, 12 Drawing Sheets

EMBEDDING INTERNET BROWSER/ BUTTONS WITHIN COMPONENTS OF A NETWORK COMPONENT SYSTEM

CROSS-REFERENCE TO RELATED APPLICATIONS

This invention is related to the following copending U.S. Patent Applications:

U.S. patent application Ser. No. 08/435,377, titled EXTENSIBLE, REPLACEABLE NETWORK COMPONENT SYSTEM;

U.S. patent application Ser. No. 08/435,374, titled REPLACEABLE AND EXTENSIBLE NOTEBOOK COMPONENT OF A NETWORK COMPONENT SYSTEM;

U.S. patent application Ser. No. 08/435,862, titled REPLACEABLE AND EXTENSIBLE LOG COMPONENT OF A NETWORK COMPONENT SYSTEM;

U.S. patent application Ser. No. 08/435,213, titled REPLACEABLE AND EXTENSIBLE CONNECTION DIALOG COMPONENT OF A NETWORK COMPONENT SYSTEM; and U.S. patent application Ser. No. 08/435,880, titled ENCAPSULATED NETWORK ENTITY REFERENCE OF A NETWORK COMPONENT SYSTEM, each of which was filed on May 5, 1995 and assigned to the assignee of the present invention.

FIELD OF THE INVENTION

This invention relates generally to computer networks and, more particularly, to an architecture for building Internet-specific services.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. These services typically range from browsing or searching for information having a particular data format using a particular protocol to actually acquiring information of a different format in accordance with a different protocol.

For example, the file transfer protocol (FTP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and Claw sound files.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented -view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as directories and documents) on any of these servers connected to the Internet and allow access to those resources.

As an example, a user "traverses" the Web by following hot items of a page displayed on a graphical Web browser. These hot items are hypertext links whose presence are indicated on the page by visual cues, e.g., underlined words, icons or buttons. When a user follows a link (usually by clicking on the cue with a mouse), the browser displays the target pointed to by the link which, in some cases, may be another HTML document.

The Gopher and Web information services represent entirely different approaches to interacting with information on the Internet. One follows a list-approach to information that "looks" like a telephone directory service, while the other assumes a page-approach analogous to a tabloid newspaper. However, both of these approaches include applications for enabling users to browse information available on Internet servers. Additionally, each of these applications has a unique way of viewing and accessing the information on the servers.

Netscape Navigator™ ("Netscape") is an example of a monolithic Web browser application that is configured to interact with many of the previously-described protocols, including HTTP, Gopher and FTP. When instructed to invoke an application that uses one of these protocols, Netscape "translates" the protocol to hypertext. This translation places the user farther away from the protocol designed to run the application and, in some cases, actually thwarts the user's Internet experience. For example, a discussion system requiring an interactive exchange between participants may be bogged down by hypertext translations.

The Gopher and Web services may further require additional applications to perform specific functions, such as playing sound or viewing movies, with respect to the data types contained in the documents. For example, Netscape employs helper applications for executing applications having data formats it does not "understand". Execution of these functions on a computer requires interruption of processing and context switching (i.e., saving of state) prior to invoking the appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to processing operations of the computer.

Typically, a computer includes an operating system and application software which, collectively, control the operations of the computer. The applications are preferably task-specific and independent, e.g., a word processor application edits text, a drawing application edits drawings and a database application interacts with information stored on a database storage unit. Although a user can move data from one application to the other, such as by copying a drawing into a word processing file, the independent applications must be invoked to thereafter manipulate that data.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

The graphical objects typically included with each window region are sizing boxes, buttons and scroll bars. These objects represent user interface elements that the user can point at with the pointer (or a cursor) to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus available to a user. Each menu, in turn, provides a list of command options that can be selected merely by pointing to them with the mouse-controlled pointer. That is, the commands may be issued by actuating the mouse to move the pointer onto or near the command selection, and pressing and quickly releasing, i.e., "clicking" a button on the mouse.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound. Several editors, each designed to handle a particular data type or format, can work on the contents of the document at is the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present invention is directed to a system for extending this capability to network-oriented services.

Therefore, it is among the objects of the present invention to simplify a user's experience on computer networks without sacrificing the flexibility afforded the user by employing existing protocols and data types available on those networks.

Another object of the invention is to provide a system for users to search and access information on the Internet without extensive understanding or knowledge of the underlying protocols and data formats needed to access that information.

Still another object of the invention is to provide a document-based computing system that enables users to develop customized user interfaces to information available on computer networks.

SUMMARY OF THE INVENTION

Briefly, the invention comprises a network-oriented component system for developing a customized user interface that displays information obtained from a resource of a computer network on a computer screen. The customized user interface is provided by embedding an entity that references a resource located on the networks into any component of the system. The embedded entity is preferably manifested as a visual object, e.g., an icon, a button or an area of the computer screen, displayed on a graphical user interface of the screen that a user may manipulate to effectuate the embedding process. The "container" component, on the other hand, is preferably a compound document having contents that include different data types and formats.

According to the invention, the embedded entity is implemented as a component of the system, and the process of embedding that component within other components of the system is achieved through a cooperating relationship between the network-oriented component system and an underlying software component architecture. Specifically, communication among the components of the system is achieved through novel application programming interfaces (APIs).

In the illustrative embodiment of the invention, the reference to the network resource is a pointer contained within the embedded component and the contents of the compound document may include, e.g., textual, graphical and audio data types and formats. Moreover, the network location or resource referenced by the entity component may include such tools and services as a Gopher browser, a Web page or a graphics viewing editor.

Advantageously, the embedding aspect of the present invention enhances the user experience of easily integrating a network resource item within a typical document to produce a customized user interface. For example, the ability to embed a button that references a network entity, such as a browser, within a document is an elegant alternative to the typical, and rather cumbersome, approach of embedding an entire browser application into the document. As described herein, the button displayed on the graphical user interface may be easily "wired" such that, upon activation, it "transports" the user to the network location of the referenced resource.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
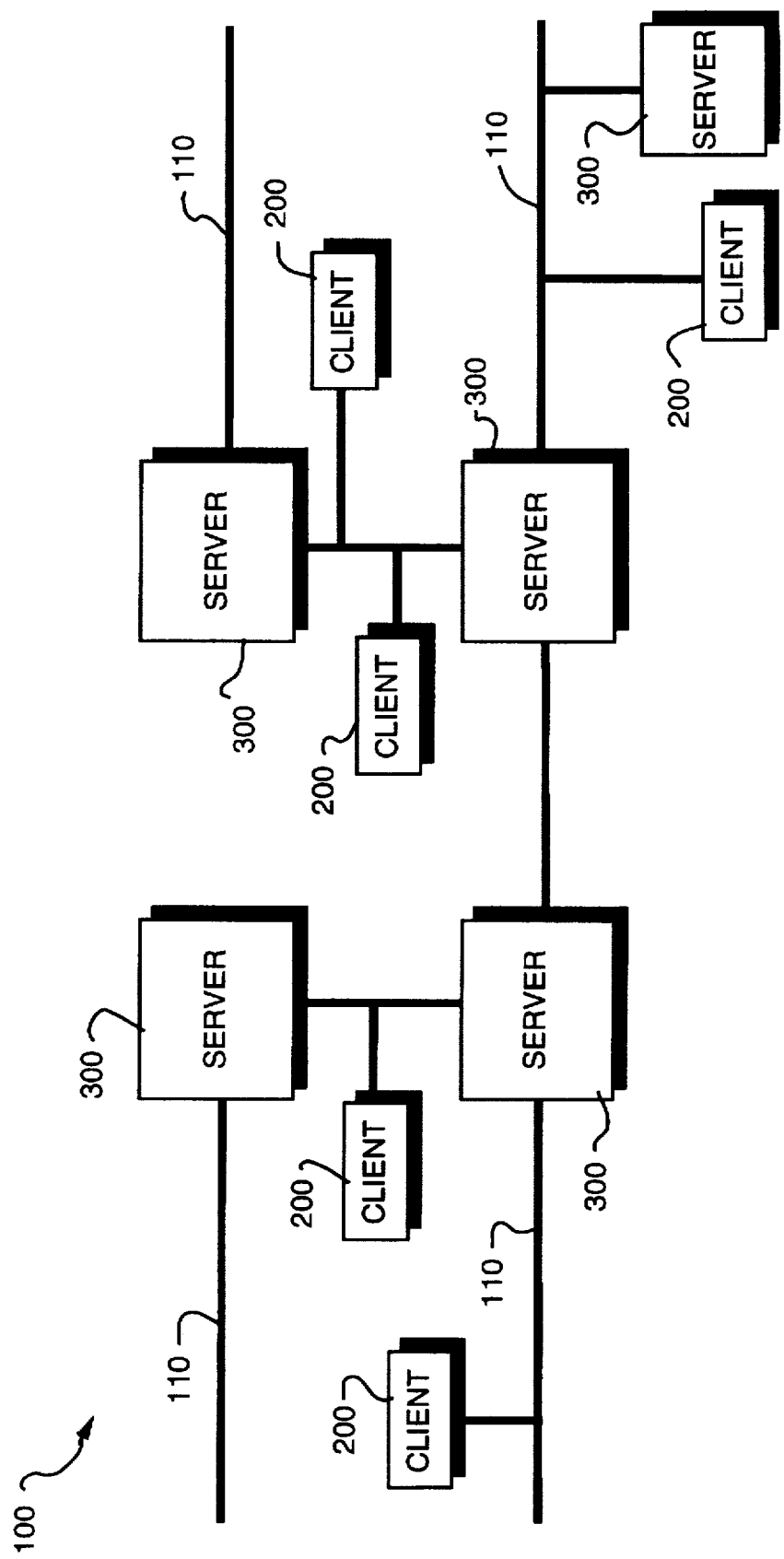
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood by those skilled in the art that, in an alternate embodiment, the client and server may exist on the same computer; however, for the illustrative embodiment described herein, the client and server are separate computers.

Several types of computer networks 110, including local area networks (LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
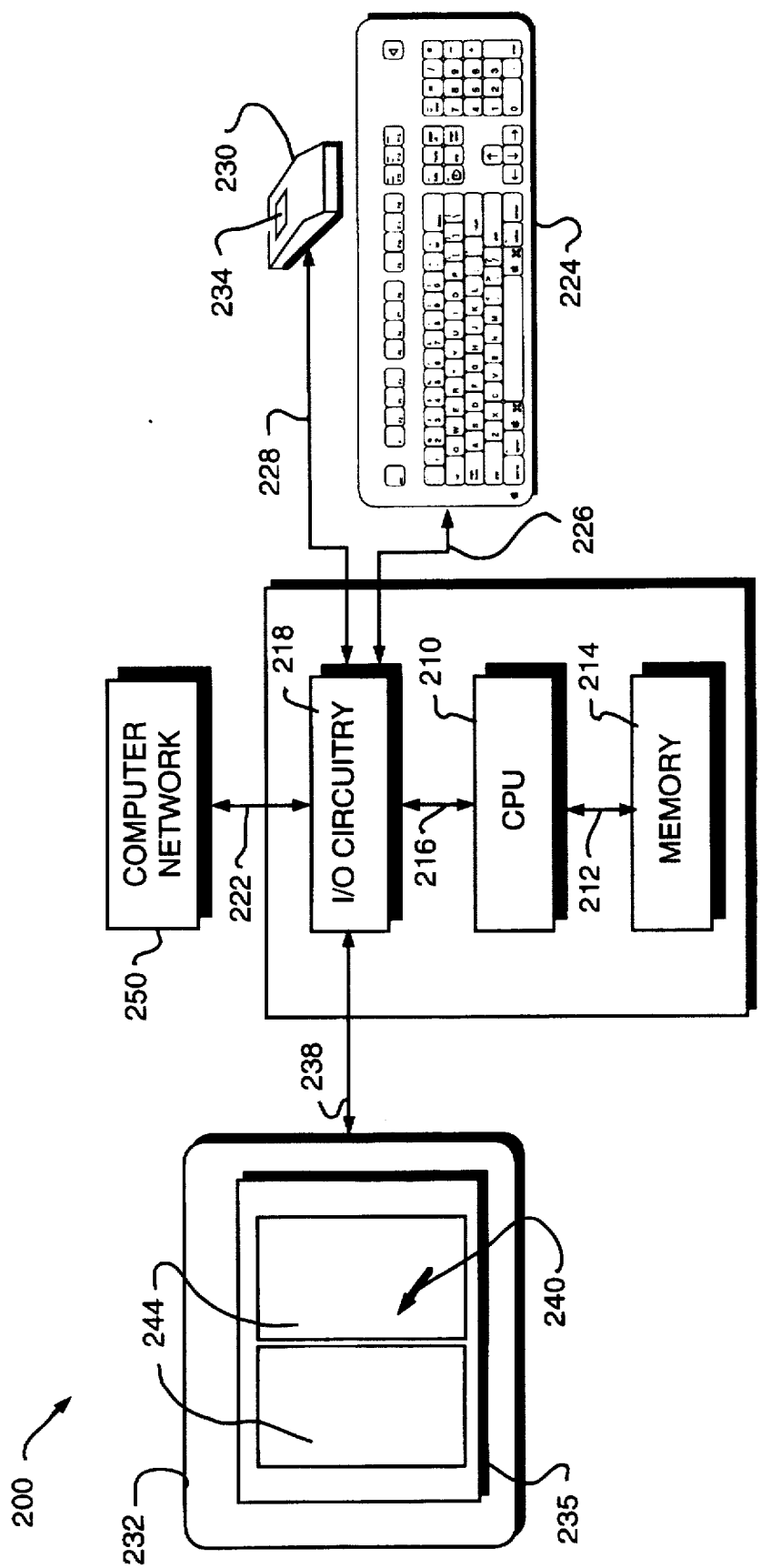
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bidirectional buses 212 and 216. The memory 214 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 210 and client computer 200.

The I/O circuitry 218, in turn, connects the computer to computer networks, such as the Internet computer networks 250, via a bidirectional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. The I/O circuitry 218 receives information, such as control and data signals, from the mouse 230 and keyboard 224, and provides that information to the CPU 210 for display on the screen 235 or, as described further herein, for transfer over the Internet 250.

Figure 3:
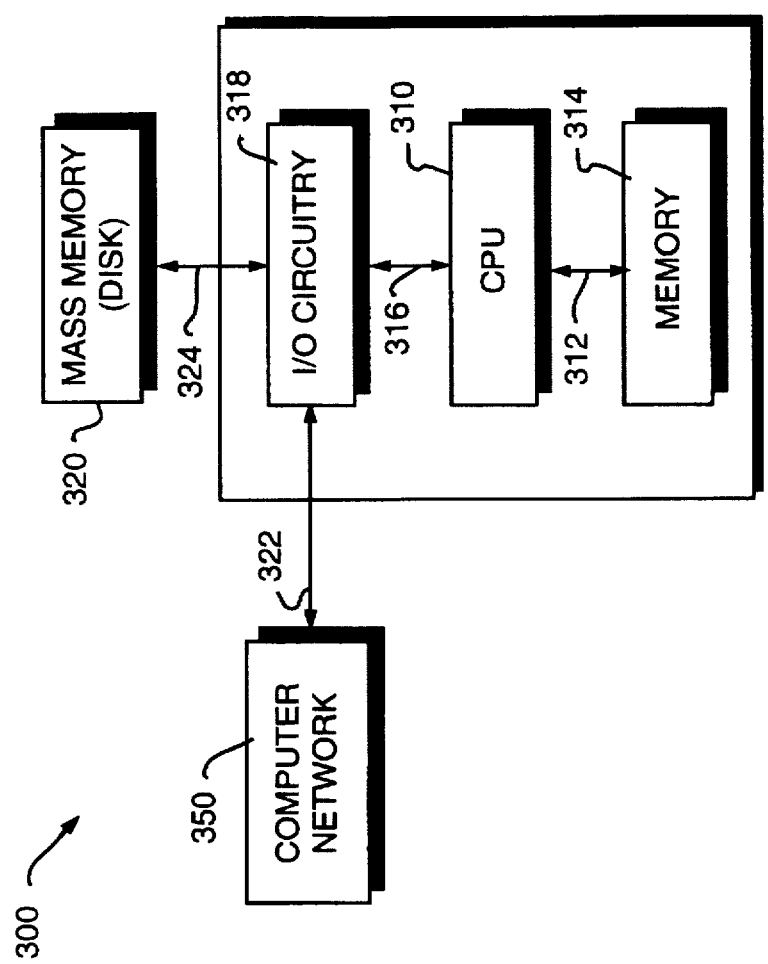
FIG. 3 is a block diagram of the server computer of FIG. 1.

FIG. 3 illustrates a typical hardware configuration of a server 300 of the network system 100. The server 300 has many of the same units as employed in the client 200, including a CPU 310, a memory 314 and I/O circuitry 318, each of which are interconnected by bidirectional buses 312 and 316. Also, the I/O circuitry connects the computer to computer networks 350 via a bidirectional bus 322. These units are configured to perform functions similar to those provided by their corresponding units in the computer 200. In addition, the server typically includes a mass storage unit 320, such as a disk drive, connected to the I/O circuitry 318 via bidirectional bus 324;

It is to be understood that the I/O circuits within the computers 200 and 300 contain the necessary hardware, e.g., buffers and adapters, needed to interface with the control devices, the display monitor, the mass storage unit and the networks. Moreover, the operating system includes the necessary software drivers to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM ® series of computers sold by International Business Machines Corp. These computers have resident thereon, and are controlled and coordinated by, operating system software, such as the Apple® System 7®, IBM OS2®, or the Microsoft® Windows® operating systems.

Figure 4:
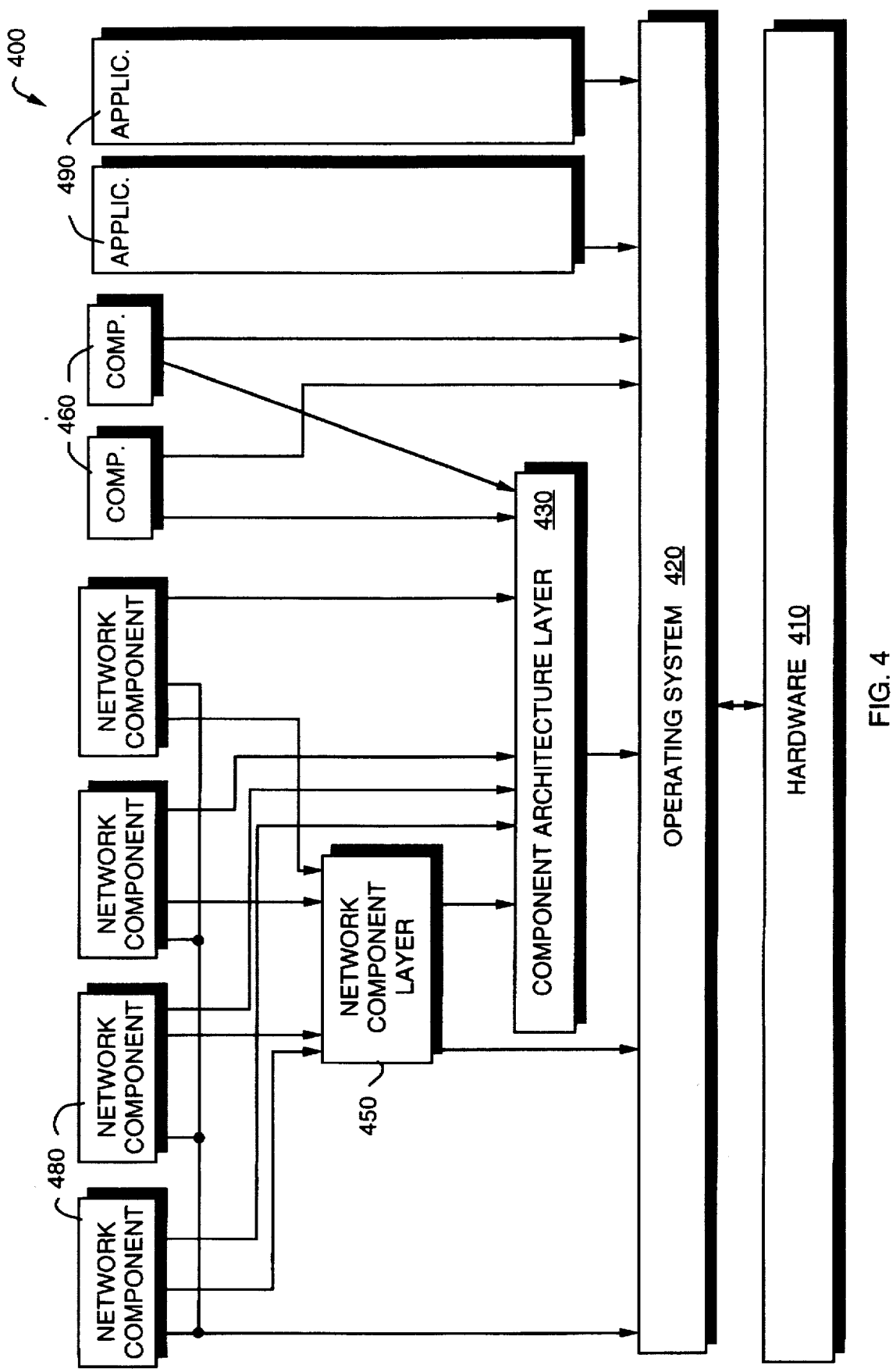
FIG. 4 is a highly schematized block diagram of a layered component computing arrangement in accordance with the invention.

As noted, the present invention is based on a modular document computing arrangement as provided by an underlying software component architecture, rather than the typical application-based environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCP/IP protocol stack and an Appletalk protocol stack.

The software component architecture is preferably implemented as a component architecture layer 430. Although it is shown as overlaying the operating system 420, the component architecture layer 430 is actually independent of the operating system and, more precisely, resides side-by-side with the operating system. This relationship allows the component architecture to exist on multiple platforms that employ different operating systems.

A network-oriented component layer 450 contains the underlying technology for implementing the network-oriented component system configured to develop customized user interfaces to computer networks by embedding entities that reference resources located on the networks into components of the system. As described further herein, this technology includes novel application programming interfaces (APIs) that facilitate communication among the entities and components to ensure integration with the underlying component architecture layer 430. These novel APIs are preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for compound documents developed by, among others, Apple Computer, Inc.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The network component layer 450 extends the functionality of the underlying component architecture layer 430 by defining network-oriented components 480 that seamlessly integrate with these components 460 to provide basic tools for navigating the Internet computer networks.

Figure 5:
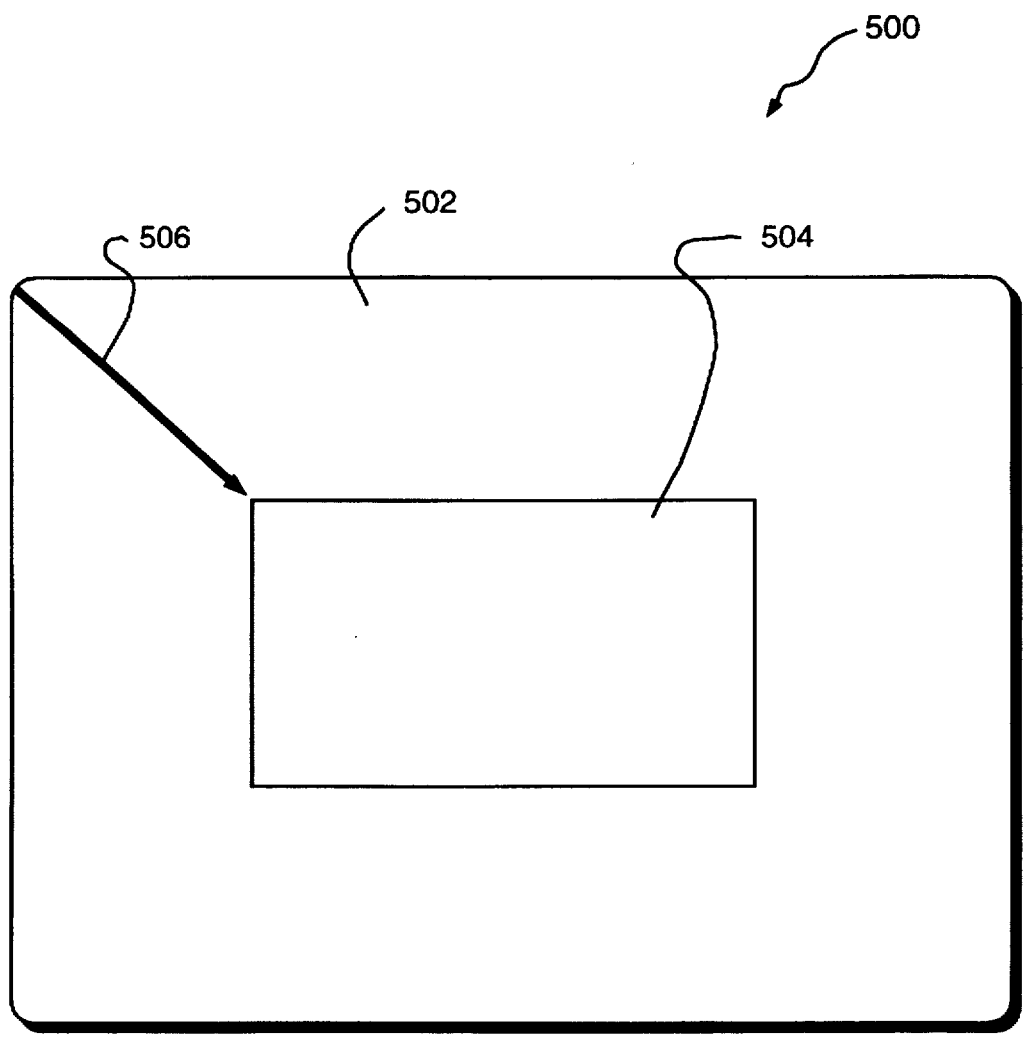
FIG. 5 is an illustration of basic primitives for defining the layout of a compound document.

The component editor is analogous to an application program in a conventional computer. That is, the editor is a software component which provides the necessary functionality to display a component's contents and, where appropriate, present a user interface for modifying those contents. Additionally, the editor may include menus, controls and other user interface elements. An internal layout element of the component architecture layer 430 is used to organize these contents of a compound document and, further, to distinguish boundaries between editors. The layout element, in turn, comprises three data structures which form primitives for defining the layout of such a document. Referring to FIG. 5, these structures include a canvas, a frame and a transformation.

Specifically, the canvas 502 is a data structure which represents the overall context of the document. It includes a description of coordinate space and a mechanism for capturing a series of graphical commands into an image or representation. Examples of canvasses are a bit or pixel map on a computer screen, a page description language for a printer and a display list for a computer display. The frame 504, on the other hand, is a data structure which serves as a shared information repository between a "container" component and an embedded component.

A transformation is a data structure which represents a set of geometric a descriptions that are applied to graphical commands. In the example of FIG. 5, the transformation is depicted as an offset 506 from a reference point, e.g., the upper left-hand corner of the canvas 502. Other types of transformations include scaling, rotation, skews and distortions. In general, the transformation is a geometric description of the location and orientation of the frame 504 on the canvas 502. Preferably, this description can be two-dimensional or three-dimensional in nature.

Referring again to FIG. 4, the relationship of applications 490 to the elements of the layered computing arrangement 400 is also shown. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the component s of the arrangement 400 are designed to work together and communicate via the common component architecture layer 430 or, in the case of the network components, via the network component layer 450.

The invention features the provision of the network-oriented component system which, when invoked, causes actions to take place that enhance the ability of a user to interact with the computer to embed an entity that references a resource located on the computer network into any component of the system. The embedded entity is manifested to a user as a visual object via a window environment, such as the graphical user interface provided by System 7 or Windows, that is preferably displayed on the screen 235 (FIG. 2). The visual object, in turn, forms an integral part of a customized user interface that facilitates interactions between the user and the computer, such as the client 200. This behavior of the system is brought about by the interaction of the network components 480 with a series of system software routines associated with the operating system 420. These system routines, in turn, interact with the component architecture layer 430 to create the windows and graphical user interface elements, as described further herein.

The window environment is generally part of the operating system software 420 that includes a collection of utility programs for controlling the operation of the computer 200. The operating system, in turn, interacts with the components to provide higher level functionality, including a direct interface with the user. Specifically, a component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 6:
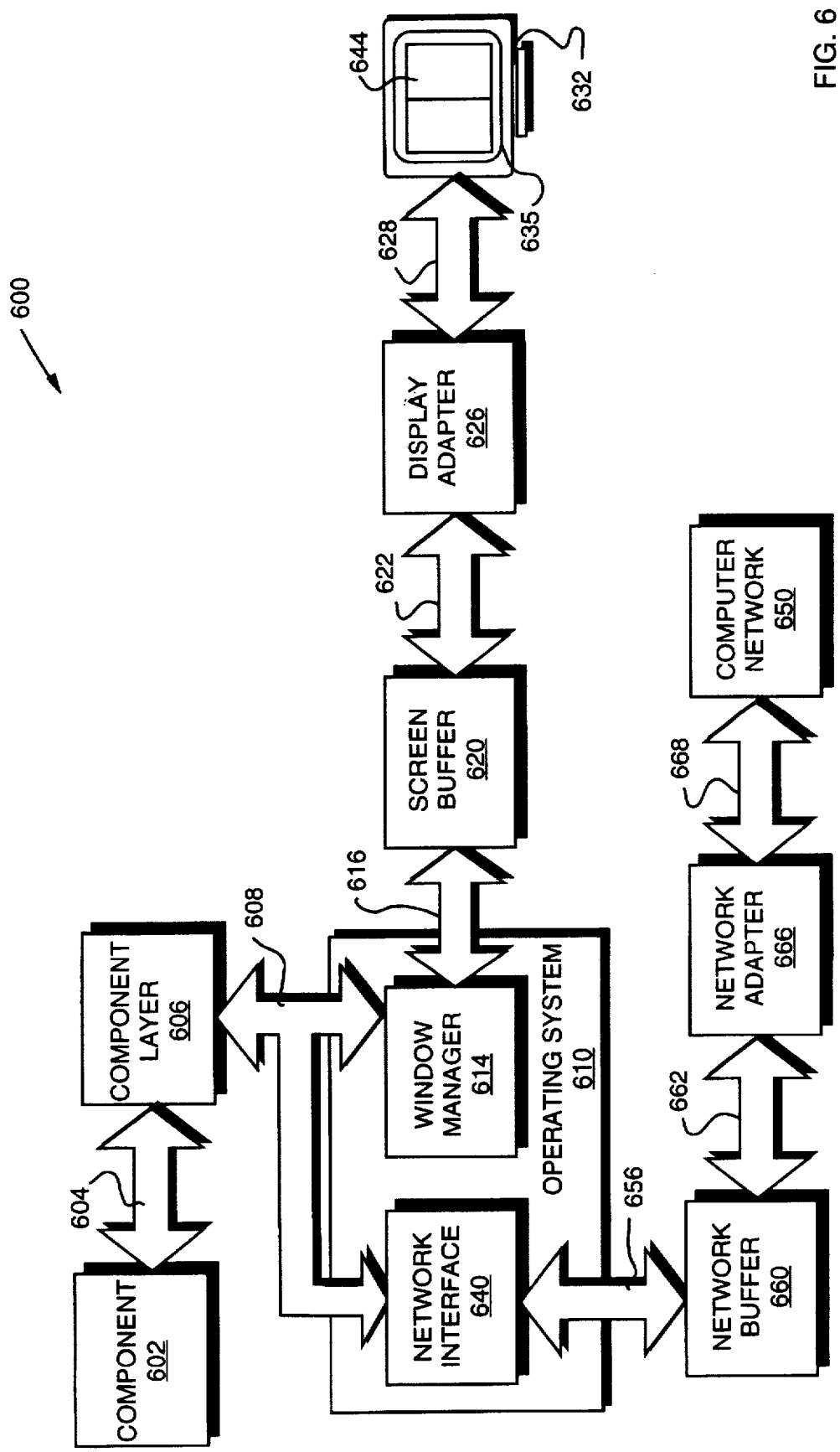
FIG. 6 is a schematic illustration of the interaction of a component, a software component layer and an operating system of the computer of FIG. 2.

FIG. 6 is a schematic illustration of the interaction of a component 602, software component layer 606 and an operating system 610 of a computer 600, which is similar to, and has equivalent elements of, the client computer 200 of FIG. 2. As noted, the network component layer 450 (FIG. 4) is integrated with the component architecture layer 430 to provide a cooperating architecture that allows any component to be embedded within any other component of the system; accordingly, for purposes of the present discussion, the layers 430 and 450 may be treated as a single software component layer 606.

The component 602, component layer 606 and operating system 610 interact to control and coordinate the operations of the computer 600 and their interaction is illustrated schematically by arrows 604 and 608. In order to display information on a screen display 635, the component 602 and component layer 606 cooperate to generate and send display commands to a window manager 614 of the operating system 610. The window manager 614 stores information directly (via arrow 616) into a screen buffer 620.

The window manager 614 is a system software routine that is generally responsible for managing windows 644 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 620 are read out of the buffer and provided, as indicated schematically by arrow 622, to a display adapter 626. The display adapter contains hardware and software (sometimes in the form of firmware) which converts the information in the screen buffer 620 to a form which can be used to drive a display screen 635 of a monitor 632. The monitor 632 is connected to display adapter 626 by cable 628.

Similarly, in order to transfer information as a packet over the computer networks, the component 602 and component layer 606 cooperate to generate and send network commands, such as remote procedure calls, to a network-specific interface 640 of the operating system 610. The network interface comprises system software routines, such as "stub" procedure software and protocol stacks, that are generally responsible for formating the information into a predetermined packet format according to the specific network protocol used, e.g., TCP/IP or Apple-talk protocol.

Specifically, the network interface 640 stores the packet directly (via arrow 656) into a network buffer 660. Under control of the hardware and software in the system, the contents of the network buffer 660 are provided, as indicated schematically by arrow 662, to a network adapter 666. The network adapter incorporates the software and hardware, i.e., electrical and mechanical interchange circuits and characteristics, needed to interface with the particular computer networks 650. The adapter 666 is connected to the computer networks 650 by cable 668.

In a preferred embodiment, the invention described herein is implemented in an object-oriented programming (OOP) language, such as C++, using System Object Model (SOM) technology and OOP techniques. The C++ and SOM languages are well-known and many articles and texts are available which describe the languages in detail. In addition, C++ and SOM compilers are commercially available from several vendors. Accordingly, for reasons of brevity, the details of the C++ and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special finction called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 7:
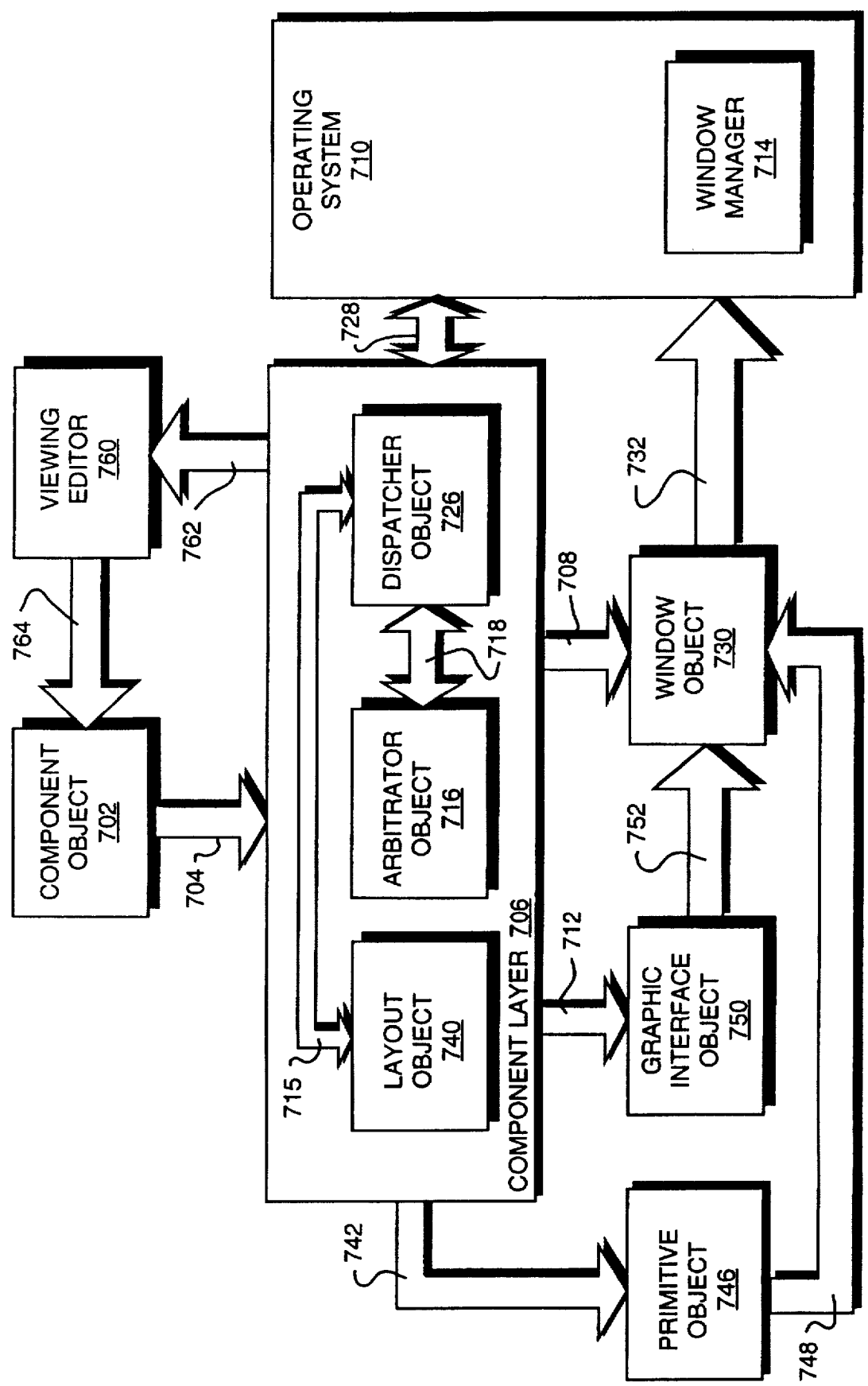
FIG. 7 is a schematic illustration of the interaction between a component, a component layer and a window manager in accordance with the invention.

In accordance with the present invention, the component 602 and windows 644 are "objects" created by the component layer 606 and the window manager 614, respectively, the latter of which may be an object-oriented program. Interaction between a component, component layer and a window manager is illustrated in greater detail in FIG. 7.

In general, the component layer 706 interfaces with the window manager 714 by creating and manipulating objects. The window manager itself may be an object which is created when the operating system is started. Specifically, the component layer creates window objects 730 that cause the window manager to create associated windows on the display screen. This is shown schematically by an arrow 708. In addition, the component layer 706 creates individual graphic interface objects 750 that are stored in each window object 730, as shown schematically by arrows 712 and 752. Since many graphic interface objects may be created in order to display many interface elements on the display screen, the window object 730 communicates with the window manager by means of a sequence of drawing commands issued from the window object to the window manager 714, as illustrated by arrow 732.

As noted, the component layer 706 functions to embed components within one another to form a compound document having mixed data types and formats. Many different viewing editors may work together to display, or modify, the data contents of the document. In order to organize the contents of the document and distinguish boundaries between the editors, the component layer 706 includes an internal layout element 740. The layout element is an object that comprises data structures such as a canvas, a frame and a transformation, each of which form primitive objects 746 for defining the layout of the document. These primitive objects are also stored in each window object 730, as shown schematically by arrows 742 and 748.

Moreover, in order to direct keystrokes and mouse events initiated by a user to the proper components and editors, the component layer 706 includes an arbitrator 716 and a dispatcher 726. The dispatcher is an object that communicates with the operating system 710 to identify the correct viewing editor 760, while the arbitrator is an object that informs the dispatcher as to which editor "owns" the stream of keystrokes or mouse events. Specifically, the dispatcher 726 receives these "human-interface" events from the operating system 710 (as shown schematically by arrow 728), and communicates with the arbitrator and layout objects (as shown schematically by arrows 718 and 715) to deliver the events to the correct viewing editor 760 via arrow 762. The viewing editor 760 then modifies or displays, either visually or acoustically, the contents of the data types.

Although OOP offers significant improvements over other programming concepts, software development still requires significant outlays of time and effort, especially if no pre-existing software is available for modification. Consequently, a prior art approach has been to provide a developer with a set of predefined, interconnected classes which create a set of objects and additional miscellaneous routines that are all directed to performing commonly-encountered tasks in a particular environment. Such predefined classes and libraries are typically called "frameworks" and essentially provide a pre-fabricated structure for a working document.

For example, a framework for a user interface might provide a set of predefined graphic interface objects which create windows, scroll bars, menus, etc. and provide the support and "default" behavior for these interface objects. Since frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of that original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level frameworks that assist in developing a user interface, to lower-level frameworks that provide basic system software services such as communications, printing, file systems support, graphics, etc. Commercial examples of application-type frameworks include MacApp (Apple), Bedrock (Symantec), OWL (Borland), NeXT Step App Kit (NeXT) and Smalltalk-80 MVC (ParcPlace).

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable network interface framework which can provide the foundation for browsing and accessing information over a computer network. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the document, component, component layer and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, network-specific operations.

Referring again to FIG. 7, the window object 730, the graphic interface object 750 and the primitive object 746 are elements of a graphical user interface of a network component system having a customizable framework for greatly enhancing the ability of a user to create a customized user interface that displays information obtained from resources of computer networks on computer screens. The customized user interface is created by embedding an entity that references a resource located on a computer network into any component of the system. The embedded entity is preferably manifested as a visual object, e.g., an icon, a button or an area of a computer screen, displayed on the graphical user interface for manipulation by a user to effectuate the embedding process.

The embedded entity is further implemented as a component of the system and the process of embedding that component within other components of the system is achieved through a cooperating relationship between the network-oriented component system and the underlying software component architecture. Specifically, this cooperating relationship allows a component to retrieve information from the network and embed that information within a compound document (in accordance with the description of FIG. 7) by either dragging a representation of the information into the document or by typing in an appropriate retrieval command. Conventional network protocols are used to deliver the information from a source of information on the network to the document.

The novel embedding aspect of the invention also involves the construction of network components, such as the visual objects, and, further, the integration of these constructed network components with computing components having typical, document-type content, such as graphics, text and audio. An example of the these computing components is a compound document having contents that include different data types and formats.

As noted, these network components are preferably implemented as objects and communication among the network component objects is effected through novel application programming interfaces (APIs). These APIs are preferably delivered in the form of objects in a class hierarchy that is extensible so that developers can create new components and editors. From an implementation viewpoint, the objects can be subclassed and can inherit from base classes to build customized components allow users to see different kinds of data using different kinds of protocols, or to create components that function differently from existing components.

Specifically, the embedded entity object is a component that operates in conjunction with an object constructed from an abstract class CyberExtension. The CyberExtension object adds additional behaviours to the component to, inter alia, keep track of a CyberItem object that the component displays. The CyberItem object, on the other hand, is constructed from a CyberItem abstract class representing a resource on the network; an example of a CyberItem object is the network entity component object described below in connection with FIG. 9.

The object created to download the information from the network resource to the compound document is preferably constructed from a CyberStream abstract class. These interconnected abstrast classes function to define the network-oriented component objects described below. A detailed description of these classes is provided in copending and commonly assigned U.S. patent application titled Extensible, Replaceable Network Component System, filed May 5, 1995, which application is incorporated by reference as though fully set forth herein.

Figure 8:
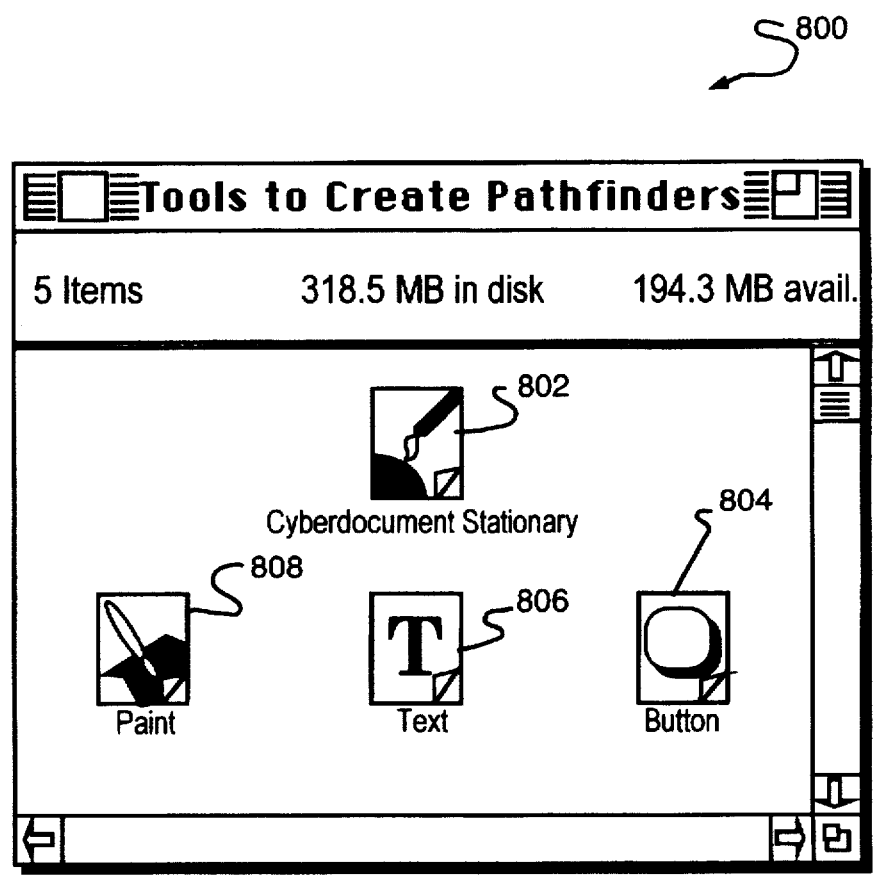
FIG. 8 depicts a folder containing selected components for building a compound document.

FIG. 8 shows a folder 800 that may be stored in the memory 214 (FIG. 2) of computer 200 and displayed on a window 244 of a screen 235. The folder preferably contains selected components that a user might employ to build a compound document. For example, the user creates a new document by clicking on the Cyberdocument stationary component icon 802. The document object created by this action is similar to a "draw" or page layout component in that various items may be embedded within locations of the page and easily moved relative to one another. Such a document provides an appropriate base for building a customized network interface.

Once the document is created, the user may embed various components, including buttons and graphics, within the document. According to an aspect of the invention, the component 804 labelled Button is an object that the user may embed into the document by dragging and dropping it at an appropriate location within the document. In addition to the button component 804, the user may add a text component 806 (or a graphics component) to enhance the appearance of the document, again by dragging and dropping components to effectuate the embedding process.

Figure 9:
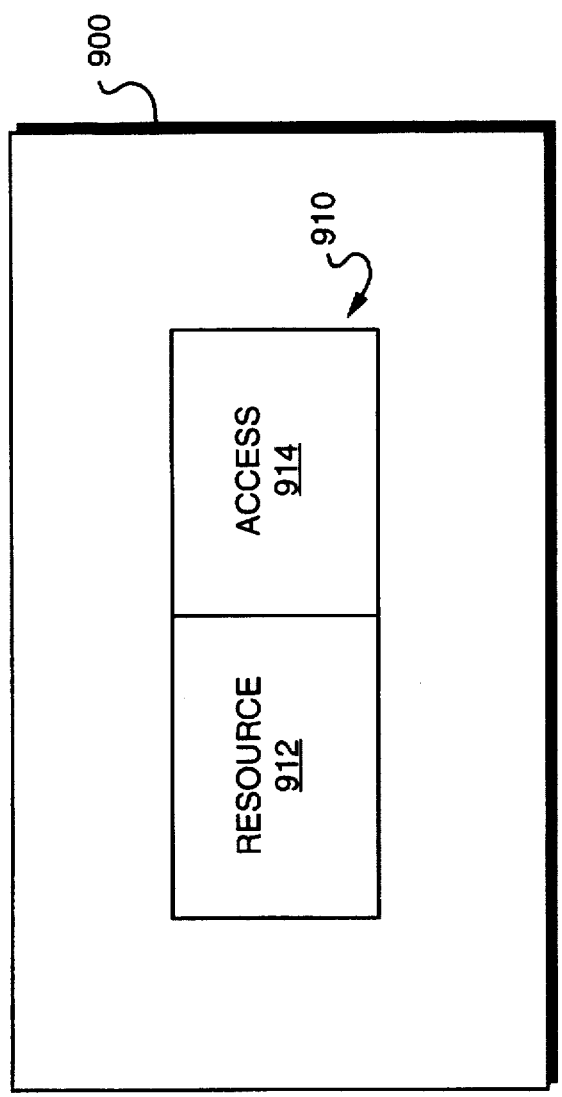
FIG. 9 is a schematic diagram showing an illustrative network entity component object in accordance with the invention.

According to the invention, the user "wires-up", i.e., associates, the button to a source of information located on the network by creating a network entity component object that references the network location prior to embedding that entity component into the document. FIG. 9 is a schematic diagram showing an illustrative network entity component object 900 containing an address pointer 910 to the information source on the network. The address pointer is stored, e.g., a uniform resource locator (URL) having a first portion 912 that identifies the particular resource and a second portion 914 that specifies the means for accessing that resource. An example of a network-oriented component system for creating an encapsulated entity that contains a reference to a network resource located on a computer network is provided in copending and commonly assigned U.S. Patent Application titled Encapsulated Network Entity Reference of a Network Component System, filed May 5, 1995, which application is incorporated by reference as though fully set forth herein.

Figure 10:
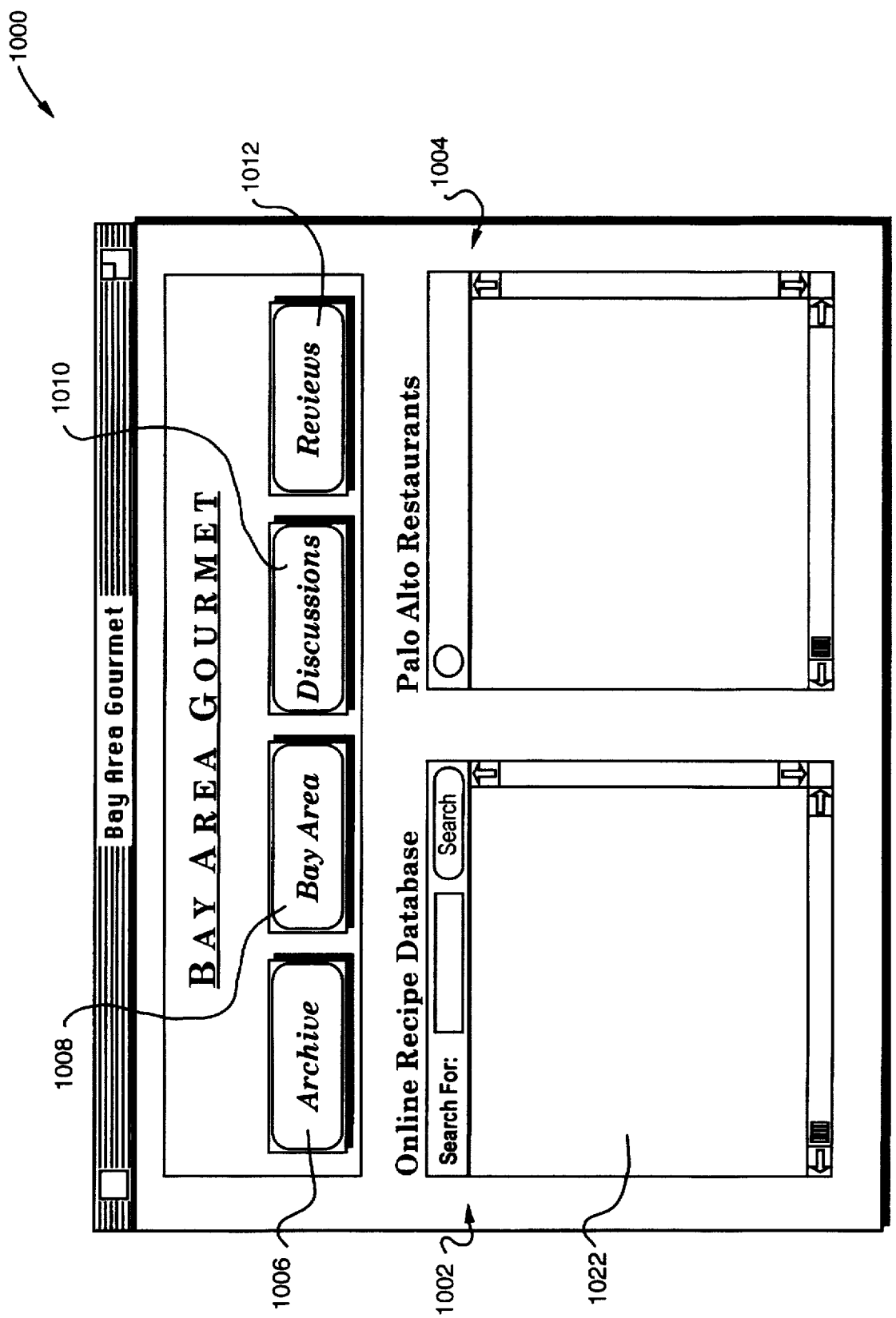
FIG. 10 illustrates a compound document displayed in a window of a computer screen.

FIG. 10 illustrates a compound document 1000 displayed in a window of a computer screen. Illustratively, the document is a drawing document with a number of embedded network components, in addition to text components representing the cosmetic graphic design of the document. A user may create such a compound document by, e.g., dragging and dropping visual objects representing the components into the document. According to the invention, this action operates to embed the components into the document to thereby generate a customized interface for searching information on the computer networks. Advantageously, the user can create such an interface without knowledge of the protocol required to search for the information.

Specifically, the network components include a search component 1002, a display component 1004 (e.g., a Web page) and four button components, the latter components labelled Archive 1006, Bay Area 1008, Discussions 1010 and Reviews 1012. Upon clicking one of these buttons, a process is started that transports the user to a resource on the network, as described herein. The search component 1002 is labelled Online Recipe Database and, as its name indicates, is configured to search for items, e.g., a resource, on the network in response to information specified by a user. After locating and accessing the specified item, the component 1002 displays it within a lower area 1022.

The display component 1004 is labelled "Palo Alto Restaurants" and is configured to display a Web page that lists restaurants in the Palo Alto area. By clicking on a particular name of a restaurant displayed on the list, the user is presented with, e.g., menus for that restaurant. Significantly, there is no requirement to invoke a separate application in order to perform the searching and listing functions.

Figure 11:
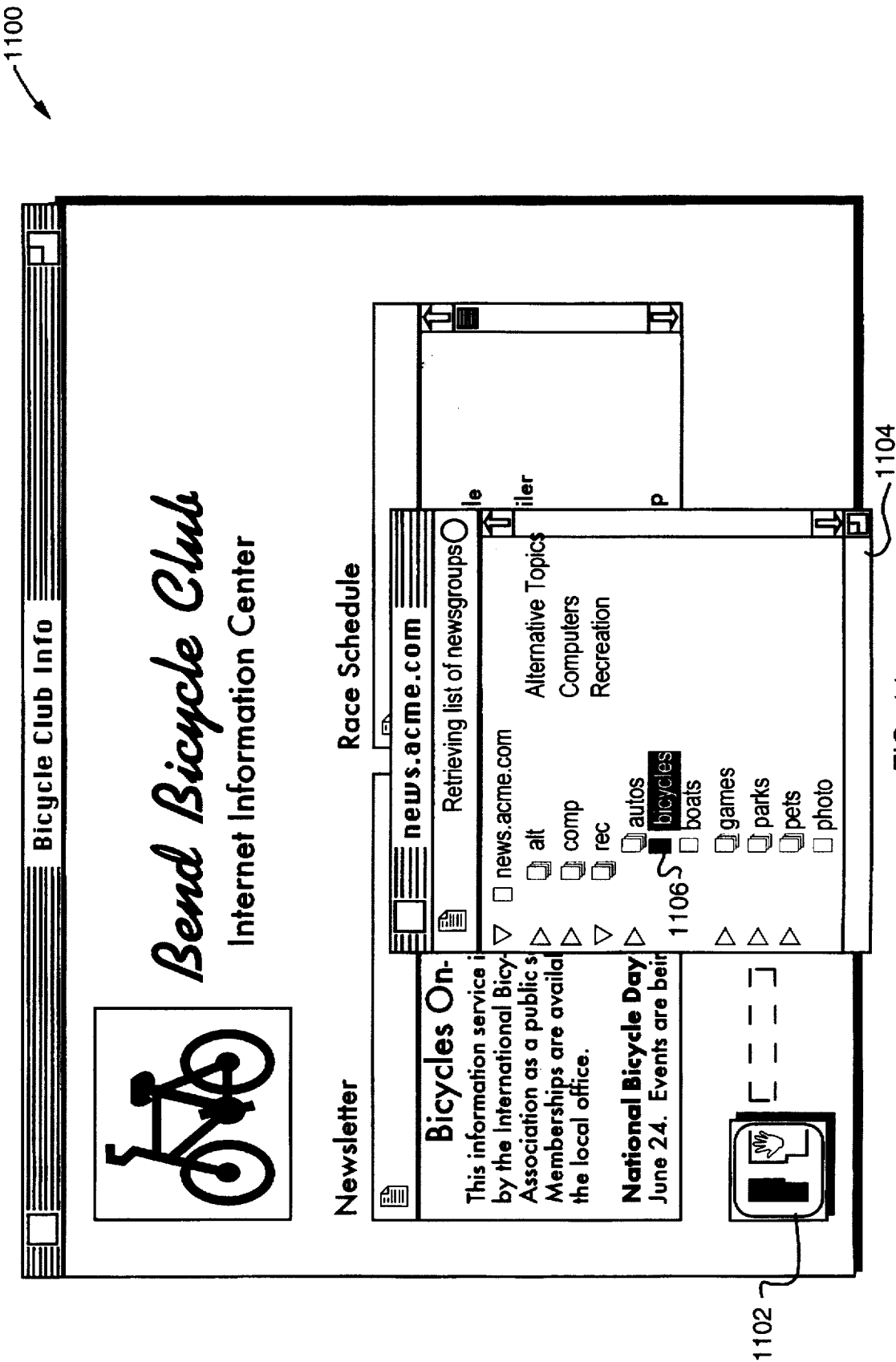
FIG. 11 depicts the connection of a network resource to a button component used to build the compound document of FIG. 10.

FIG. 11 depicts the connection of a network resource, e.g., a conventional Internet protocol service such as a netnews discussion group, i.e., to a button 1102. Initially, an iconic representation of a button is dragged from the folder 800 (FIG. 8) onto a document 1100 labelled Bicycle Club Info. A graphic picture is added to the button by dragging and dropping a graphic component from a scrapbook of graphic elements (not shown) onto the button.

To connect the button to the network resource, the user further drags a list of postings in a rec.bicycles newsgroup onto the button 1102 and releases the list. Specifically, a window 1104 containing that group is opened and the appropriate bicycles icon 1106 is dragged onto the button. Upon completion of the "wiring" operation, the window 1104 containing the current list of postings will open whenever the user clicks on the button 1102. The user is further presented with tools (e.g., viewer and editor components of FIG. 7) needed to participate in the discussion, such as for replying to messages and editing text and pictures.

Figure 12:
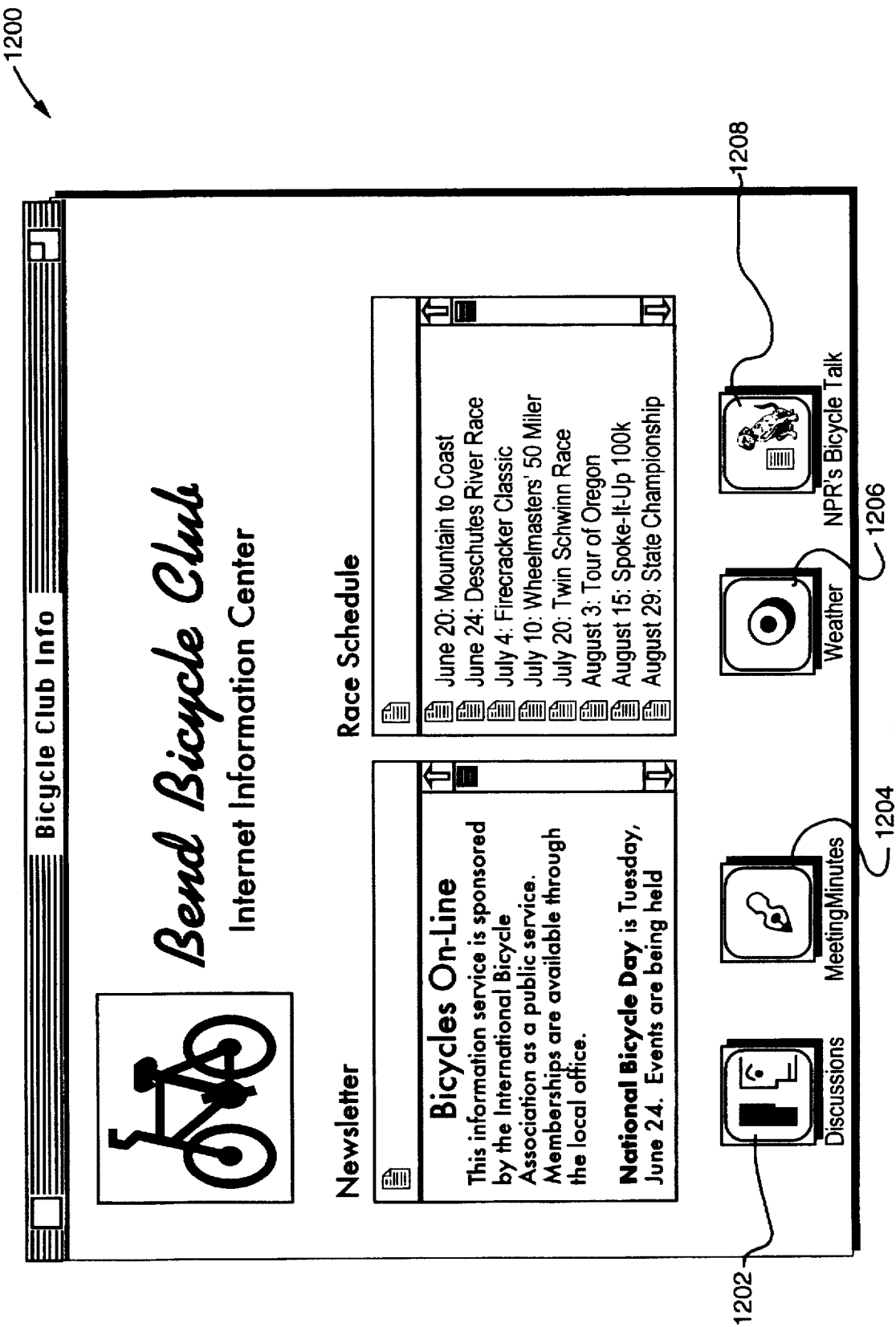
FIG. 12 illustrates a completed customized network interface document in accordance with the invention.

Lastly in FIG. 12, a completed customized network interface document 1200 is created by adding three more buttons 1204–1208 which are defined (and wired) as described above. The completed document may be distributed to users having connections to the network, and the customized network interface 1200 will provide these users with direct access to network resources by merely clicking on corresponding buttons. In other words, clicking on a visual object associated with a network entity and its referenced resource initiates a series of events that results in the desired information from the resource being displayed on the screen. For example, upon clicking on the button, corresponding network entity (CyberItem) object is invoked which, in turn, spawns a data stream (CyberStream) object to obtain the actual information. These two network objects then cooperate to "transport" the user to that network location by displaying the actual information in the embedded compound document object.

While there has been shown and described an illustrative embodiment for building customized user interfaces by embedding entities that reference resources located on the networks into components of the system, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for developing a customized user interface of a computer that displays information obtained from a resource of a computer network on a display screen, the display screen having associated therewith a pointing device, the method comprising the steps of:

generating a document for display on the screen;

associating a visual object with a network entity component configured to reference the resource of the computer network;

embedding the network entity component within the document by dragging and dropping the visual object onto the document with the pointing device; and clicking on the visual object with the pointing device to display the information from the resource on the screen.

2. The method of claim 1 wherein the step of associating comprises the step of constructing the network entity component containing an address pointer to the resource on the network.

3. The method of claim 1 wherein the step of embedding comprises the step of forming primitives that define the layout of the document.

4. The method of claim 1 wherein the step of clicking comprises the steps of:

invoking the network entity component;

spawning a data stream to obtain the information from the resource; and displaying the information on the document.

5. The method of claim 4 further comprising the steps of:

controlling operations of the computer with an operating system coupled to a component architecture of the system; and integrating a network component layer of the computer system with the component architecture to provide a cooperating component computing arrangement.

6. The method of claim 5 further comprising the step of retrieving the information from the resource using the cooperating component computing arrangement.

7. Apparatus for developing a customized user interface of a computer that displays information obtained from a resource of a computer network on a display screen, the display screen having associated therewith a mouse, the apparatus comprising:

means for generating a document for display on the screen;

means for associating a visual object with a network entity component configured to reference the resource of the computer network;

means for embedding the network entity component within the document by dragging and dropping the visual object onto the document with the mouse; and means for clicking on the visual object with the mouse to display the information from the resource on the screen.

8. The apparatus of claim 7 wherein the means for associating comprises means for constructing the network entity component containing an address pointer to the resource on the network.

9. The apparatus of claim 7 wherein the means for embedding comprises means for forming primitives that define the layout of the document.

10. The apparatus of claim 7 wherein the means for clicking comprises:

means for invoking the network entity component;

means for spawning a data stream to obtain the information from the resource; and means for displaying the information on the document.

11. The apparatus of claim 10 wherein the means for generating a document comprises a component architecture system of the computer.

12. The apparatus of claim 11 wherein the visual object comprises one of an icon, a button and an area of the display screen.

13. The apparatus of claim 12 wherein the means for embedding comprises a network-oriented component system integrated with the component architecture system that enables the document to include mixed data types and formats.

14. The apparatus of claim 13 wherein a first of the primitives comprises a canvas representing the context of the document.

15. The apparatus of claim 14 wherein the canvas further comprises a description of coordinate space and a mechanism for capturing graphical commands into an image representation.

16. The apparatus of claim 15 wherein the canvas is one of a bit map, a page description language and a display list for the display screen.

17. The apparatus of claim 16 wherein a second of the primitives comprises a frame that serves as a shared information repository between the network entity component and the document.

18. The apparatus of claim 17 wherein a third of the primitives comprises a transformation representing a set of geometric descriptions applied to the graphical commands.

19. A method for developing a customized user interface of a computer that displays information obtained from a resource of a computer network on a display screen, the display screen having associated therewith a device for controlling a cursor on the screen, the method comprising the steps of:

creating a window manager object from an operating system of the computer;

drawing a window for display on the display screen using the window manager object;

generating a document object for display on the window;

associating a visual object with a network entity object configured to reference the resource of the computer network;

embedding the network entity object within the document by dragging and dropping the visual object onto the document object with the cursor-controlled device; and clicking on the visual object with the device to display the information from the resource on the screen.

20. The method of claim 19 wherein the step of clicking comprises the steps of:

invoking the network entity object;

spawning a data stream object to obtain the information from the resource; and displaying the information on the document object.

* * * * *